UNITED STATES PATENT OFFICE.

HERBERT C. GORE, OF TAKOMA PARK, MARYLAND, AND CHARLES O. TOWNSEND, OF WASHINGTON, DISTRICT OF COLUMBIA.

PROCESS FOR MAKING SYRUP FROM SUGAR-BEETS.

1,155,806.      Specification of Letters Patent.      Patented Oct. 5, 1915.

No Drawing.      Application filed May 19, 1915. Serial No. 29,209.

(DEDICATED TO THE PUBLIC.)

*To all whom it may concern:*

Be it known that we, HERBERT C. GORE and CHARLES O. TOWNSEND, citizens of the United States of America and employees of the Department of Agriculture, said HERBERT C. GORE residing at Takoma Park, in the county of Montgomery, State of Maryland, (whose post-office address is Takoma Park, Maryland,) and the said CHARLES O. TOWNSEND residing in the city of Washington, District of Columbia, (whose post-office address is Washington, District of Columbia,) have invented a new and useful Process for Making Syrup from Sugar-Beets.

This application is made under the act of March 3, 1883, chapter 143 (22 Stat., 625), and the invention herein described and claimed may be used by the Government of the United States or any of its officers or employees in the prosecution of work for the United States, or by any person in the United States, without the payment of any royalty thereon.

Our invention relates to a process for preparing syrup from sugar beets.

In practising our invention, we first remove the crowns from the beets and wash the product, and then cut the beets into thin chips or slices, preferably by means of a suitable vegetable cutter. Upon reducing the product to small sections or parts, we place the treated material in a suitable vessel or receptacle, adapted to be heated by any convenient means, and cover the chopped material with hot or cold water. We then heat the vessel containing the treated beet material and water by direct fire or by heat supplied from any convenient source until the temperature of the mixture is raised to or near the boiling point. We then subject the mixture to such temperature for a period sufficient to extract sugar from the beet material. The time consumed for this purpose depends largely upon the thickness of the slices or chips. We find that it usually takes from one-half hour to two or more hours to remove sugar from the sliced beet material by boiling. In practice, we have discovered that the thinner the slices are cut, the shorter the time required to remove the sugar from the beet sections. From experiments we have ascertained that in cases where thin chipped beets are used, it only requires about one-half hour of boiling to extract the necessary amount of sugar from the beet product, and that in cases where beet slices are used, which are approximately one-quarter inch in thickness, it requires about one and one-half hours to remove sufficient sugar from the beet for the purpose of producing the product herein described. During the period of boiling the mixture, we find that a large proportion of the sugar and other diffusible substances in the sliced or chipped beets pass into the water, and by treating the water absorbing the sugar and other diffusible substances from the beet product in the manner as we hereinafter describe, a savory and delicious syrup can be produced. When the mixture specified has been sufficiently boiled to effect the removal from the beet material a large proportion of the sugar and other diffusible substances present in the product, we then remove the boiled beet product from the liquid by using a dipper having a perforated bottom, so that the liquid scooped up with the beet material may drain back into the kettle or vessel. It is desirable that all the beet material should be removed from the liquid. At this stage the liquid has an objectionable flavor; consequently, to remove this objectionable flavor, and to reduce the liquid to syrup, we subject the liquid to further heat treatment. The liquid extract is slowly boiled down until it reaches the condition of syrup. During this process it is desirable occasionally to skim the liquid or to remove therefrom particles of suspended matter which are conducive to cause burning by sticking to the sides of the kettle or vessel under the surface of the boiling liquid. The liquid extract should be boiled from two to four hours, and we find that it is advisable to boil the extract very slowly during the first period of evaporation, and then boil the extract rather rapidly toward the last, in order to avoid scorching the syrup. If the syrup is scorched, it will possess a bitter flavor. We find that, if the liquid extract is treated in the manner as herein described, the resulting product will consist of a syrup of delightful and pleasant flavor. The beet material removed from the heating vessel may again be treated in the same way with fresh quantities of water for extracting therefrom further amounts of sugar, but we prefer to discard the cooked beets, inasmuch as they can be used as a stock feed for cattle or hogs, or devoted to any other purpose for which they may be adapted.

Having thus described our invention, we claim:

1. A process for making syrup from sugar beets, consisting in removing the beet crowns, washing the beets, and cutting them into finely divided parts, placing the treated material in water, and subjecting said mixture to heating at a temperature near the boiling point for a period sufficient to extract sugar from the fragmentary beet sections, then completely removing the beet particles and subjecting the liquid extract for a time to a slow boiling and then for a time to a rapid boiling, for removing the objectionable beet flavor from said extract, substantially as specified.

2. A process for making syrup from sugar beets, consisting in removing the beet crowns, washing the beets, and cutting them into small parts, placing the treated material in water and heating the mixture at a boiling temperature for a period sufficient to extract sugar from the beet product, then completely removing the cooked beet material, and then evaporating the liquid extract by boiling it slowly for a time and then rapidly, until the liquid extract is boiled down to the condition of syrup, substantially as specified.

In testimony whereof, we affix our signatures in the presence of two subscribing witnesses.

HERBERT C. GORE.
CHARLES O. TOWNSEND.

Witnesses:
L. B. FLENNER,
M. A. WULFERT.

Copies of this patent may be obtained for five cents each, by addressing the "Commissioner of Patents, Washington, D. C."